Aug. 13, 1968

R. L. LAUZE 3,396,714

TENSIONED INTERNAL DIAMETER CUTTING WHEEL ASSEMBLY

Filed Feb. 1, 1965

INVENTOR.
ROBERT L. LAUZE

BY
Charles F. Dischler

ATTORNEY

INVENTOR.
ROBERT L. LAUZE
BY
Charles F. Diehler
ATTORNEY

United States Patent Office 3,396,714
Patented Aug. 13, 1968

3,396,714
TENSIONED INTERNAL DIAMETER CUTTING
WHEEL ASSEMBLY
Robert L. Lauze, Manhattan Beach, Calif., assignor to
Navan Products, Inc.
Continuation-in-part of application Ser. No. 395,494,
Sept. 10, 1964. This application Feb. 1, 1965, Ser.
No. 431,764
11 Claims. (Cl. 125—15)

This is a continuation-in-part of my application Ser. No. 395,494, filed Sept. 10, 1964, and now abandoned.

This invention relates to circular saws and cutting wheels of the internal cutting type, wherein the blade comprises an annulus with a cutting surface at its inner periphery for use in dicing or cutting thin wafers or slices from semiconductor materials and minerals. More particularly, the present invention relates to a novel holding ring structure and method for providing uniform radial tensioning and stretching of the annular blade to positively insure planar flatness and precise concentricity of the central peripheral cutting edge of the blade.

Internal diameter (ID) cutting wheel assemblies have largely replaced outside diameter (OD) cutting wheels in the art of dicing or cutting thin slices or plates from quartz, silicon and germanium crystals, as well as materials such as gems, ceramics, glass, refractories and the like. The reasons for this are readily apparent. When operating in an optimum condition, such thin internal diameter wheels reduce the wastage encountered with the inherently thicker outside diameter wheels by reduction in the size of the kerf produced by the wheel and by the fact that they are able to produce a smoother and more parallel surface on the cut crystals or wafers. However, in practice it has been found that the arrangement for holding and tensioning such internal diameter blades does not long maintain the desired radial tension in the annulus or the concentricity required of the circular cutting edge with respect to the workpiece whereby the maximum potential of such blades could be realized.

Generally, in the prior art, holding ring structures comprise either two or three rings for holding and tensioning the blade annulus with three rings being most commonly used. In Sayers Patent No. 2,713,339, the annular disk is held and tensioned by means of two sets of complementary annular interengaging grooves and projections concentrically formed in the opposed faces of the two segments of the holding ring between which the saw is clamped. Again, in Patent No. 3,039,235 to Heinrich, the outer peripheral edge of the blade annulus is merely clamped between two flat parallel radially extending surfaces while tensioning is then obtained in the normal manner by means of a third ring having an annular protuberance for interengagement with an annular groove formed in one of the holding rings.

It has also been suggested to secure the outer peripheral portion of the blade annulus to the holding ring members by various arrangements utilizing pins, screw fasteners, rivets and the like and even embedment in the material of a unitary holding ring structure. When pins, screws or rivets are used the outer periphery of the wheel adjacent such securing means bears against such means and after a period of usage this portion of the periphery tends to either deform or tear a sufficient amount so as to result in a lessening of the wheel holding power of the assembly with a consequent lessening of the blade tension and loss of concentricity due to unequal deformation.

As has been indicated, under optimum operating conditions, i.e., as when the blade is correctly mounted in either of the two aforesaid prior art arrangements, and the blades and their mounting ring structure are in a relatively new condition without much operating time, internal cutting blades produce a superior result and have largely displaced outside diameter cutting wheels in the industries in which they find use. However, due to the severe operating conditions and the exacting quality requirements of the finished product, it has been found that, after a relatively short period of operation, the internal diameter cutting wheels no longer possess the optimum conditions of radial tensioning, flatness and concentricity of the inner cutting edge that is required for continued production. Consequently, all too frequent blade changes are required in order to maintain high standards of quality in the finished product. The reason for such deficiencies in wheels of this type is directly traceable to the inadequacy of the holding ring structures presently used for tensioning of the annular blades.

Prior methods of centering and tensioning ID cutting wheels have normally employed centering devices for aligning the wheel with the holding rings and for holding all elements in alignment while the holding rings are clamped together, usually by screw fasteners, to hold and tension the cutting wheel. These methods are time consuming, resulting in considerable loss of available usage time of the cutting equipment, and the proper mounting of the wheels is, to a large extent, a function of the skill of the operator. To overcome these disadvantages, the present invention provides a method and means for securely and positively gripping the outer marginal edge of the annular blade fully around its circumference in such a manner that, as the radial tensioning force is applied to the thin blade, the material of the blade is displaced outwardly in such a uniform manner that the inner diameter of the annular blade is increased while maintaining substantially perfect concentricity. More specifically, the present invention contemplates a two-part holding ring structure wherein both parts have matching configurations for first bending or holding the metal therebetween to positively grip the wheel as the holding ring parts are moved toward each other and which, upon continued movement of the two-ring parts into mating juxtaposition, is then tensioned over an inner annular bead.

Accordingly, it is the primary object of this invention to provide a relatively simple, inexpensive, pretensioned assembly of an internal diameter cutting blade and a holding ring assembly and a process for the manufacture of such cutting wheel assemblies that will provide a positive and long lasting blade holding and tensioning action whereby the blade flatness and concentricity will be retained for a prolonged period of usage.

It is another object of the present invention to provide a uniformly pretensioned and accurately configured ID cutting wheel that is available as an article of manufacture for ready installation with precise concentricity upon a cutting machine spindle or drum which can be disposed of upon termination of its useful life.

Another object of the present invention is the provision of an inside diameter cutting wheel assembly wherein the cutting wheel is positively and forcefully gripped around its outer marginal edge so that relaxation or deformation of the blade, with consequent reduction of the blade tension, is prevented.

Still another object of the present invention is the provision of a cutting wheel assembly wherein the blade is tensioned so evenly and its dimensional integrity maintained so accurately that the cutting life of the blade is increased manyfold.

Yet another object of the present invention resides in the provision of a holding ring structure providing uniform and positive gripping and tensioning action by means of but two opposing rings.

Still a further object of the present invention is the provision of a method for sequentially positively gripping and tensioning an annular cutting blade between a pair of complementary rings as the latter are brought into mating juxtaposition.

These and other objects and advantages of the present invention will become apparent when read in the light of the accompanying drawings and specifications, wherein.

Figure 1:
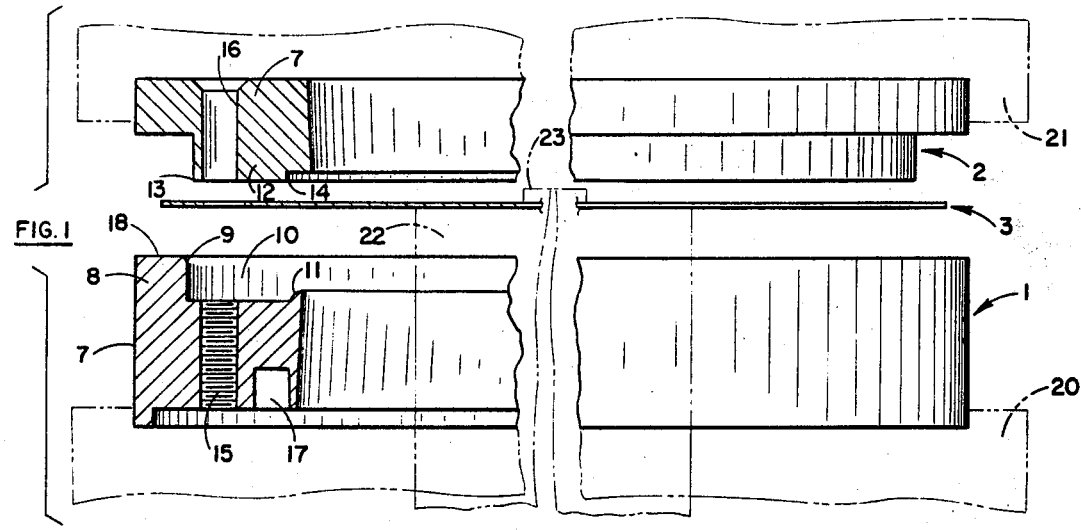
FIG. 1 is a fragmentary elevational view, partly in cross-section, of the cutting wheel and the holding ring elements of the present invention showing these components mounted on an arbor press ready for assembly into an integral composite tensioned cutting wheel assembly.

Referring specifically to the drawings and referring at first to FIG. 1, numerals 1 and 2 indicate the female and male rings, respectively, of a holding ring structure for securing and tensioning an internal diameter cutting wheel 3 therebetween. The present invention holds the annular blade 3 so securely and tensions it so evenly that no problem, such as cracking of the abrasive material 4, is encountered with respect to the mounting of blades to which the abrasive cutting material such as diamond bort, has been previously applied. Therefore, a completed diamond wheel may be readily mounted by the structure of this invention and it is not necessary to first install and tension the blade before applying the abrasive cutting material as has been suggested in the prior art. The latter method is at best a difficult, if not impractical, process.

As illustrated in FIG. 1, female holding ring member 1 comprises an annular body member 7 having a rim portion 8 extending longitudinally from one planar face with shoulder 9 defining an annular cavity 10. At the inner peripheral edge of such face and at the bottom of cavity 10 an annular bead 11 is formed. Final tensioning of the blade is performed over this bead in a manner well known in the art and as further described hereinbelow.

Male holding ring member 2 includes a longitudinally extending annular plug portion 12 having outer and inner shoulders 13 and 14 for coaction with shoulder 9 and annular bead 11, respectively, of ring member 1. Ring members 1 and 2 also include a plurality of matching apertures 15 and 16, respectively, for reception of bolt, rivet or similar fasteners, although, as will be pointed out hereinbelow, the use of such a fastening means is not required in the practice of the present invention and merely serves as an added safety or "fool proofing" means to prevent accidental separation of the cutting wheel assembly. Rings 1 and 2 also have matching apertures 31 and 32 for mounting of the blade assembly onto the drum or spindle of the cutting machine. Ring 1 further includes an annular lightening cavity 17 formed around the outer face of such ring member to reduce the weight of the wheel in a balanced manner.

Figure 2:
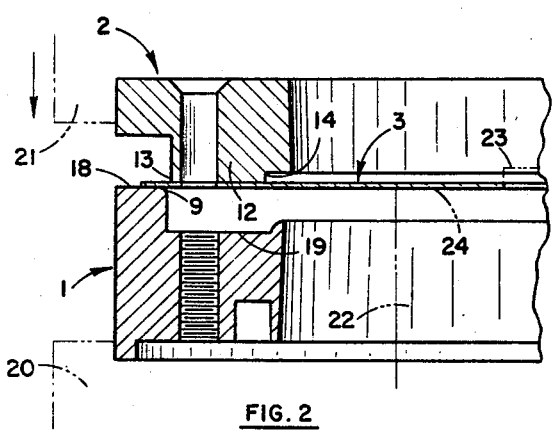
FIG. 2 is a partial sectional view through the holding ring structure of FIG. 1 showing the relationship of the wheel assemblies and the press just prior to the forming and assembly of the composite blade structure.
Figure 4:
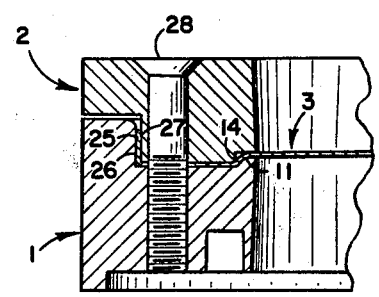
FIG. 4 is a still further partial sectional view of the holding ring structure of FIG. 3 fully assembled with the blade firmly secured and tensioned and fastening means added to insure against accidental separation of the ring elements.

For purposes of illustrating a method of assembly of the wheel and the operative relationship of the individual elements during such assembly, FIG. 1 shows holding ring members 1 and 2 and the blade 3 positioned on portions of an arbor press comprising a platen 20, a ram 21 and an adjustable sub-ram 22, all shown in phantom lines on the drawing. Such press forms no part of the present invention and is merely illustrative of one method by which wheel assemblies may be made in accordance with the present invention. In this apparatus blade 3 fits snugly over and is positioned by spindle 23 while resting on shoulder 24 of sub-ram 22. As ram 21, carrying male holding ring 2, descends toward platen 20, sub-ram 22 is actuated by hydraulic or spring forces in a well known manner to also descend or retreat into platen 20. Thus, as plug portion 12 makes contact with the upper side of blade 3, the outer peripheral edge of the lower surface of the blade momentarily contacts face 18 of rim 8 and all parts are in correct relationship, as shown in FIG. 2, for the forming operation whereby the blade will be securely clamped and evenly tensioned between the mating holding rings. The apparatus described above is only illustrative of one way of expeditiously forming the cutting wheel and pressing the assembly into an integral structure. Any type of press or other apparatus is equally usable as long as the initial precise assembled relationship shown in FIG. 2 pertains at the initiation of the forming operation.

Figure 3:
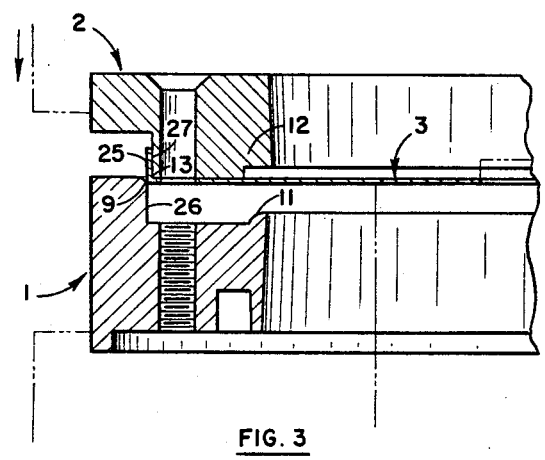
FIG. 3 is a further partial sectional view through the holding ring structure of FIG. 2 showing the forming of the outer marginal portion of the wheel blade into a rim or lip as the shoulders of the holding rings move past each other as the press continues to close.

As the press ram 21 continues to descend and annular plug portion 12 of male ring 2 is advanced into cavity 10, shoulder 13 on ring 2 begins to descend inside shoulder 9 on ring 1 with a predetermined clearance therebetween. As this occurs a sharp fold is formed circumferentially around the blade between shoulders 9 and 13, as shown in FIG. 3. Diamond wheel blades of the type utilized herein are normally of Phosphor bronze with a thickness of approximately 2 to 5 mils and as this folding action takes place the outer marginal portion 25 springs into an upright position normal to the plane of the blade (as shown in FIG. 3). Blades of other materials, such as stainless steel, are equally amenable to use in the arrangement of the present invention.

The essence of the present invention resides in this folding or crimping action around the circumferential edge portion of the blade. "Crimp" is defined in Webster's New International Dictionary, second edition, as "to fold or plait in small regular undulations in such a way that the material will retain the shape intended" and also "to give a wavy appearance to" or "to impart sinuosities or inequalities to." This substantially describes the folding over of the marginal edge of the blade since the excess metal therein tends to form sinuous undulations therearound. As the rings are pressed into each other marginal portion 25, containing such undulations, acts as a piece of shim material between the opposing shoulder surfaces 26 and 27 to form a tight press fit between each of such surfaces and its adjacent blade surface thereby securely locking the blade around its circumference and providing an initial tensioning of the blade. As the ram continues to descend the lower blade surface contacts the raised bead 11 and final tensioning is accomplished as the ram completes its stroke and forces the lower face of the blade adjacent to bottom surface 19 of cavity 10. Dependent on the dimensions of bead 11 and shoulder 14 the blade need not necessarily seat on surface 19 in order to adequately tension the blade. The inner annular portion of the blade remains at the higher level of the top of the bead 11 and as the marginal portion of the blade is bent over the bead by shoulder 14 final tensioning occurs. Meanwhile, blade outer marginal portion 25 is forced downwardly between shoulder surfaces 26 and 27 to securely lock flange 25 therebetween fully around its circumference. In this manner the blade is so securely held that upon completion of final tensioning over bead 11 a standard nominal 8⅛" outer diameter blade (after bending) having an inner diameter of approximately 3¼" has its inner diameter uniformly increased by approximately 15 thousandths of an inch. The uniformity of the radial tensioning and of the metal movement effected may be shown by measuring the gap between the wheel cutting edge and the spindle circumference. Such gap is found to be concentric with the spindle being evenly divided 7.5 mils on each side, thus showing the efficacy of applicant's holding ring structure. Upon final assembly of the ring and wheel elements, secondary securing devices such as bolts 28 may be installed through apertures 15 and 16, not as a blade holding means, but to provide a safety feature against inadvertent disassembly of the holding ring structure.

It is a requirement of applicant's arrangement that the holding rings be of a rigid, non-resilient material having precisely dimensioned and machined matching surfaces to ensure a press or interference type fit of the marginal flange portion 25 between shoulder surfaces 26 and 27. Preferably a light metal such as aluminum is employed with the holding rings being die cast therefrom. Because of the superior results and the substantial increase in the life of the cutting wheels of this type that has resulted from the present invention, due to the positive manner in which the wheel is gripped without relaxation or loosening of such grip and the even, concentric tensioning that is attainable as a result of such positive securement of the wheel edge, it is economical to manufacture and utilize such wheel assemblies as pretensioned throwaway units. However, such mode of use is optional and not mandatory since the rings may be separated, the old blade removed and a new blade installed. However, it will be found upon attempting to separate the two rings that, after removal of the bolts or rivets, the rings are so tightly secured together by means of flange 25 that it is necessary to drive them apart by means of a hammer and chisel.

The embodiment of FIGS. 1-7 is primarily configured to be used with cutting machines of the so-called Hamco type as shown in U.S. Patent No. 3,039,235, wherein the blade is in a horizontal position.

Figure 8:
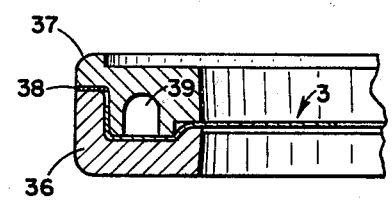
FIG. 8 is a partial sectional view taken along the plane of line 8—8 in FIG. 7.
Figure 5:
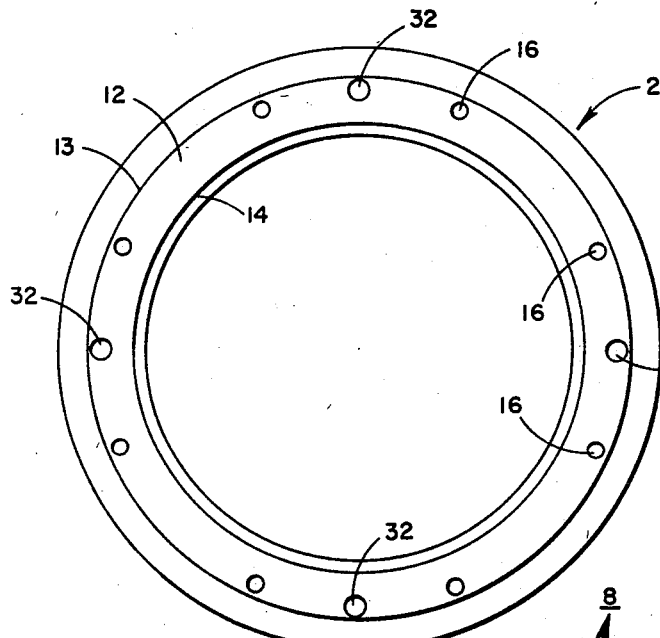
FIG. 5 is a bottom plan, or internal, view of the upper holding ring element, i.e., the male ring shown mounted on the press ram in FIG. 1.
Figure 7:
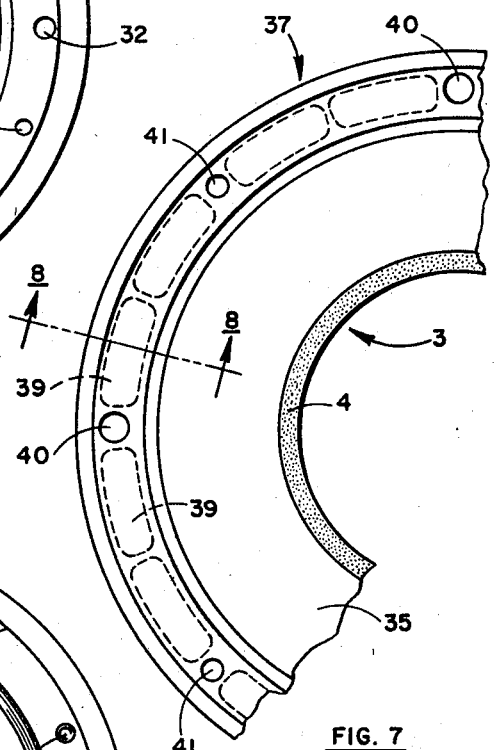
FIG. 7 is a partial top plan view of another embodiment of the present invention.
Figure 6:
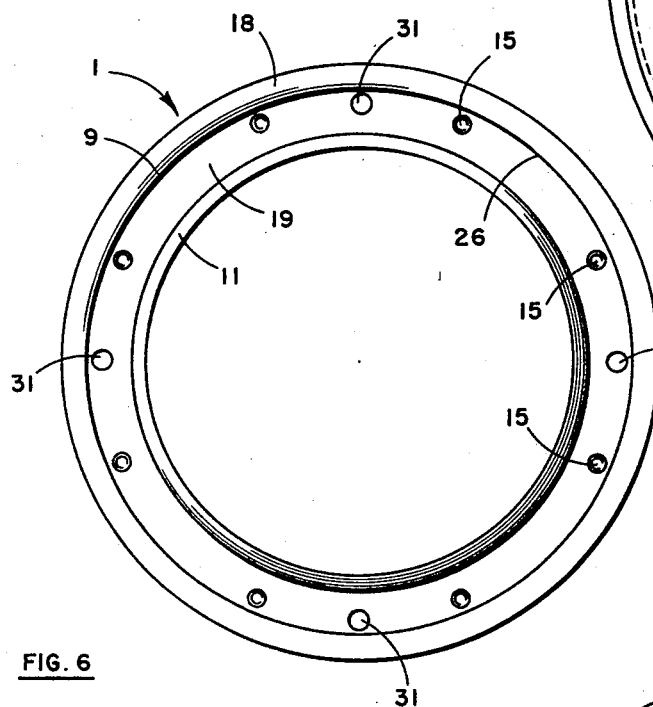
FIG. 6 is a top plan, or internal, view of the lower holding ring element, i.e., the female ring shown mounted on the press platen in FIG. 1.

FIGS. 7 and 8 illustrate another or universal configuration that is adapted to fit all of the other types of cutting machines currently in general use in the industry. As shown in FIG. 7, the blade 35 is positioned, secured and tensioned in precisely the same manner as described above. However, instead of using a pin type auxiliary fastener to ensure integrity of the clamping ring structure, the outer radial matching edges of rings 36 and 37 are adhesively bonded together at 38. This reduces the number of holes required in the wheel to only those apertures 40 required for mounting of the assembled blade and holding ring structure onto the spindle or drum of the cutting machine and any such alignment apertures 41 as may be utilized in assembly. In this embodiment lightening cavities 39 are provided at intervals in the face of the plug formed on male ring 37.

Figure 9:
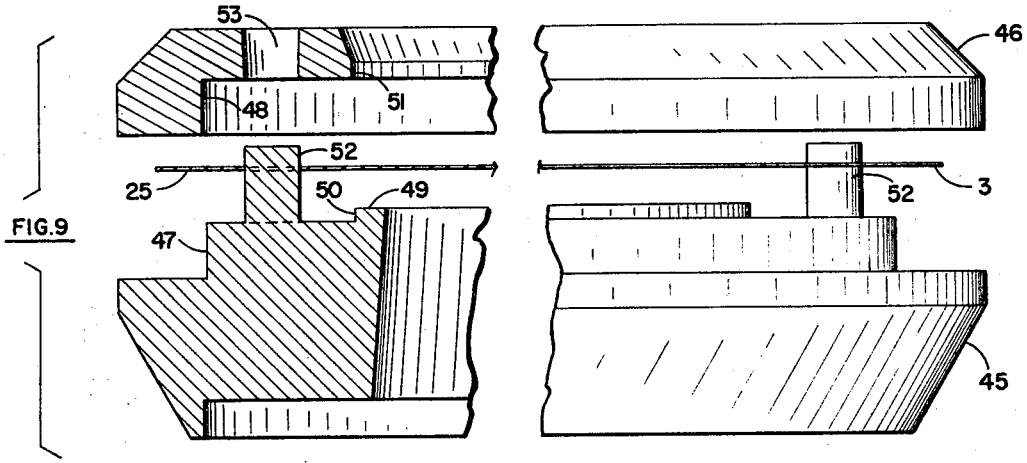
FIG. 9 is a fragmentary elevational view, partly in cross-section, of the cutting wheel and holding ring elements of another embodiment of the present invention showing these components in correct relationship ready to be assembled into a composite tensioned cutting wheel assembly.
Figures 10, 11:
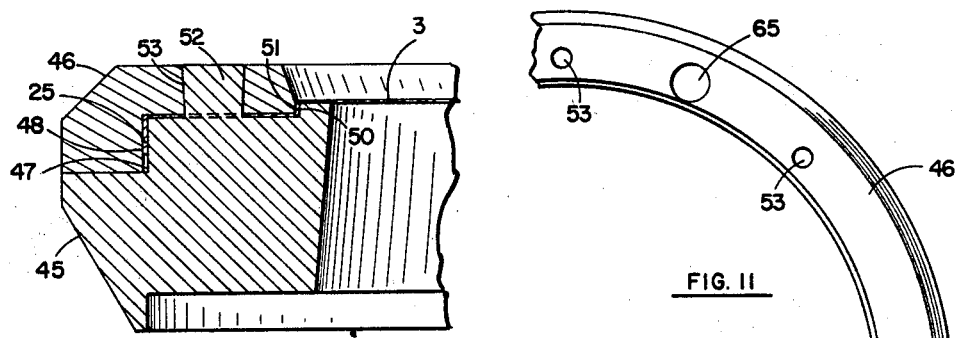
FIG. 10 is a partial sectional view of the embodiment of FIG. 9 with the structure fully assembled and the blade firmly secured and tensioned.
FIG. 11 is a partial top plan view of the upper holding ring of FIGS. 9 and 10.

FIGS. 9 through 11 illustrate another embodiment of the "universal" configuration that has been designed for optimum performance as well as maximum producibility. In this design, as best shown in FIGS. 9 and 10, the greatest mass of material is contained in holding ring 45, which is adapted to receive the cutting wheel 3 for securing and tensioning thereon. Lightening holes, not shown, are preferably formed in ring 45 as previously described. Complementary holding ring 46 is then formed as a relatively thin lightweight structure. This embodiment is particularly adapted for use wherein the holding rings are formed of low or medium strength materials, such as cast aluminum. It has been found that since the lower holding ring 45 serves as a platen to react the ram load during the pressing operation, some deformation may occur if such lower ring does not have sufficient rigidity. This deformation is prevented by making the lower ring heavier at the expense of the upper ring without increasing the overall mass of the wheel assembly.

In this embodiment the outer marginal portion 25 of the blade is turned downwardly, instead of upwardly as in the previously described embodiments, to be crimped between shoulders 47 and 48 in the manner previously described. As the ram continues to descend and completes its stroke, the blade is tensioned by deformation over raised bead 49 by the coaction of shoulders 50 and 51 on rings 45 and 46, respectively.

To insure the integrity of the assembled wheel, a plurality of rivets orf pins 52, as best shown in FIGS. 9 and 10, are cast integral with ring 45 for insertion through apertures 53 in ring 46. After pressing the wheel assembly together, with the resultant tensioning of the cutting wheel 3, pins 52 are then peened or riveted to further securely lock the assembly together. As shown in FIG. 11, suitable matching bolt holes 65 are provided in the rings and wheel for mounting the assembly on the spindle of the cutting machine.

Figure 12:
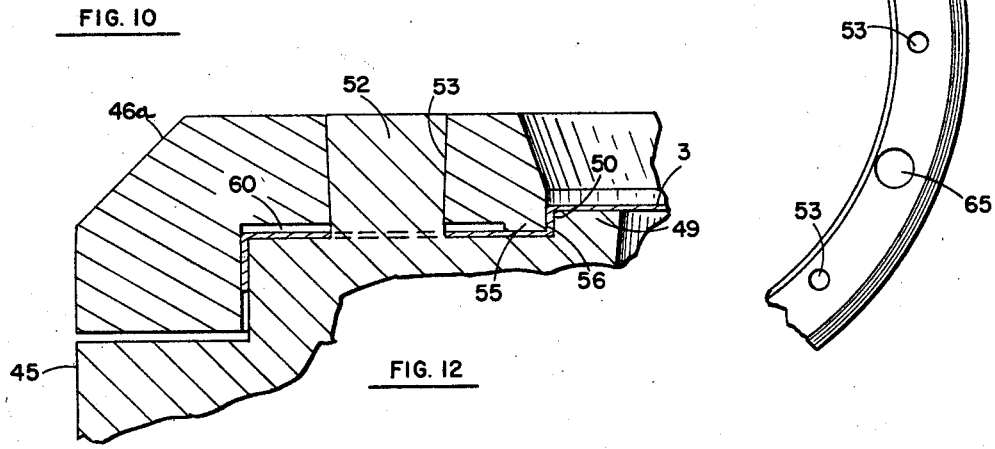
FIG. 12 is an enlarged partial sectional view of a modification of the embodiment of FIGS. 9–11.

FIG. 12 illustrates a preferred modification of the embodiment of FIGS. 9 thru 11 wherein the faying tensioning surface of ring 46a is formed with an annular raised portion or bead 55. The outer shoulder 56 of this bead cooperates with the shoulder 50 of bead 49 formed on ring 45 to tension the blade. Cavity 60 has sufficient depth, approximately .0015 inches, to provide a built-in tolerance so that dimensional defects resulting from the casting process as well as the radius formed at the base of each pin 52 do not act as stops to prevent complete mating of the tensioning shoulders 56 and 50.

Figure 13:
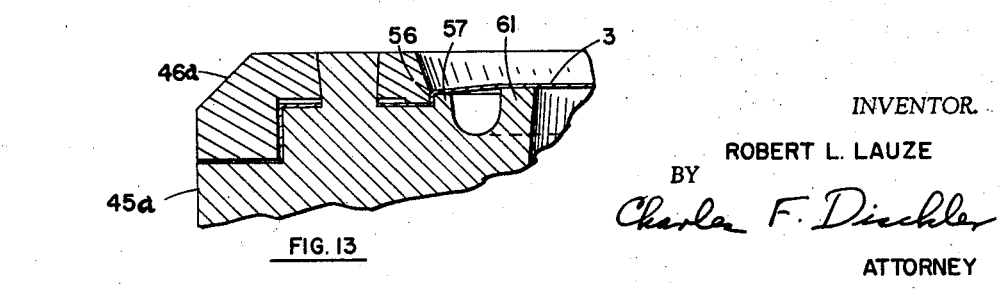
FIG. 13 is a partial sectional view of a further modification of the embodiment of FIG. 12.

FIG. 13 is a further modification of the embodiment of FIG. 12 adapted for use with the so-called Hamco type machine. In this design an additional raised annular bead or protuberance 61 is provided radially inwardly of tensioning bead 57. Bead 61 bears against blade 3 to form a seal thereagainst and prevent outward flow of the cooling and lubricating cutting fluid and entrained cuttings.

Thus, it will be seen that I have provided simple but exceedingly effective internal cutting blade assemblies. Assemblies made in accordance with my invention have been used for cutting as many as 6000 silicon semiconductor wafers each and when removed were in excellent condition capable of continued optimum cutting. Prior to my invention an output of 4000 wafers had been considered an exceedingly good production rate per blade.

While particular embodiments of this invention have been illustrated and described herein, it will be apparent that various changes and modifications may be made in the construction and arrangement of the various parts without departing from the spirit and scope of this invention in its broader aspects or as defined in the following claims.

I claim:
1. A holding ring structure for separately gripping and tensioning an internal diameter cutting wheel comprising a female ring having an annular cavity formed in one radial surface defined by an inner annular shoulder and an outer annular shoulder on a different radial plane than the inner annular shuolder, a male ring having an annular plug complementary to said cavity formed on one radial surface with inner and outer annular shoulders on different radial planes complementary to the inner and outer annular shoulders on said female ring so that when said rings are pressed together with an internal diameter cutting wheel therebetween the outer marginal edge of the wheel is folded into a flange normal to the plane of the wheel and securely gripped between the outer shoulders of said female and male rings and upon continued advancement of said plug into said cavity the wheel is radially tensioned between the inner shoulders of said female and male rings.

2. A holding ring structure for securely gripping and tensioning an internal diameter cutting wheel comprising a first ring having a first inwardly facing annular shoulder at its inner edge and a second inwardly facing annular shoulder intermediate its inner and outer edges, a second ring having a first outwardly facing annular shoulder near its inner edge and a second outwardly facing annular shoulder intermediate said first outwardly facing shoulder and the outer edge of said second ring, said second inwardly and outwardly facing shoulders being in a different radial plane than said first inwardly and outwardly facing shoulders and coming into juxtaposition before said first inwardly and outwardly facing shoulders when said rings are moved into juxtaposition, said second inwardly and outwardly facing shoulders being complementary to each other for forming a flange normal to the plane of the wheel and securely gripping therebetween such flanged outer edge of the cutting wheel, said first inwardly and outwardly facing shoulders being complementary to each other for deforming the wheel therebetween and thereby radially tensioning the wheel.

3. A holding ring structure as set forth in claim 2 wherein said second inwardly and outwardly facing annular shoulders extend longitudinally a greater extent than said first inwardly and outwardly facing annular shoulders whereby upon pressing of said rings together with a cutting wheel therebetween the wheel is first securely gripped between said complementary second shoulders and then tensioned between said complementary first shoulders.

4. A holding ring structure as set forth in claim 3 wherein said first and second inwardly and outwardly facing annular shoulders comprise longitudinally extending cylindrical surfaces.

5. A method for forming a tensioned internal diameter cutting wheel assembly comprising the steps of providing a thin annular wheel having a cutting edge on its inner periphery, a female ring having an annular cavity formed in one radial face of the ring defined by an inner and an outer annular shoulder and a male ring having an annular plug complementary to said cavity formed on a matching radial face with inner and outer annular shoulders complementary to the inner and outer annular shoulders of said female ring with such inner and outer shoulders being on different radial planes with the outer shoulders coming into juxtaposition before said inner shoulders when said rings are brought together, placing said wheel in axial alignment between said first and second rings with the outer marginal edge of said wheel extending beyond the outermost annular shoulder on said second ring, then sequentially first pressing said first ring onto said second ring to fold the outer marginal edge of said wheel normal to the plane of said wheel between said complementary outer annular shoulders, whereby said wheel is securely held by said rings, and then continuing to press said first ring fully into said second ring to axially tension said wheel between said complementary inner annular shoulders.

6. A method for forming a tensioned internal diameter cutting wheel assembly comprising the steps of providing a thin annular wheel having a cutting edge on its inner periphery, a first ring having in cross-section concentric opposed inwardly facing annular shoulders and a second ring having in cross-section concentric opposed outwardly facing annular shoulders complementary to said inwardly facing annular shoulders on said first ring with the outermost complementary shoulders being at a different elevation than the innermost complementary shoulders, placing said wheel in axial alignment between said first and second rings with the outer marginal edge of said wheel extending beyond the outermost annular shoulder on said second ring, sequentially pressing said first ring onto said second ring to fold the outer marginal edge of said wheel out of the plane of said wheel between said complementary outer annular shoulders, whereby said wheel is securely held by said rings, and then continuing to press said first ring fully into said second ring to axially tension said wheel between said complementary inner annular shoulders.

7. A tensioned internal diameter cutting wheel assembly comprising a thin annular wheel with a cutting edge on its inner periphery and with its outer marginal edge folded substantially normal to the plane of the wheel around its perimeter so that said folded marginal edge extends in a longitudinal direction and a pair of opposed annular means having opposed concentric axially extending cylindrical surfaces securing the folded outer marginal edge of said wheel therebetween.

8. A tensioned internal diameter cutting wheel assembly as in claim 7 and further including means for uniformly radially tensioning said wheel in an outward direction.

9. A tensioned internal diameter cutting wheel assembly comprising a thin annular wheel with a cutting edge on its inner periphery and with an upstanding flanged outer marginal edge; means for securely and uniformly holding said wheel by its upstanding flanged marginal edge and means uniformly radially tensioning said wheel in an outward direction, said means for securely and uniformly holding said wheel including opposed annular rings having complementary annular shoulders with complementary longitudinally extending cylindrical surfaces securing the flanged outer marginal edge of said wheel therebetween, said upstanding flanged outer marginal edge and said cylindrical surfaces being integrally locked together by means of an interference type press fit.

10. A method for forming a tensioned internal diameter cutting wheel assembly consisting of a thin annular wheel having a cutting edge on its inner periphery secured and tensioned by opposed annular members each having inner and outer complementary annular shoulders comprising the sequential steps of folding the outer marginal edge of said wheel substantially normal to the plane of the wheel between the outer complementary shoulders of said annular members by partially pressing said annular members together and then while holding the folded outer marginal edge between said outer complementary annular shoulders uniformly tensioning said wheel in a radial outward direction by bending the wheel between said inner complementary annular shoulders by fully pressing said annular members together, said folded outer marginal edge and said outer complementary shoulders being integrally locked together by means of an interference type press fit.

11. A method for forming a tensioned internal diameter cutting wheel assembly comprising the sequential steps of providing a thin annular metal wheel having a cutting edge on its inner periphery, folding the outer marginal edge of said wheel substantially normal to the plane of the wheel between complementary mating rings to securely grip said wheel and then, while the wheel is thus securely held, uniformly tensioning said wheel in a radial outward direction by displacing the inner planar portion of the wheel from its original elevation to a different elevation with respect to the outermost planar marginal edge of the wheel.

References Cited

UNITED STATES PATENTS

| | | | |
|---|---|---|---|
| 1,009,467 | 11/1911 | Bryant | 84—411 |
| 2,485,985 | 10/1949 | Perry | 84—411 |
| 2,713,339 | 7/1955 | Sayers | 125—15 |
| 2,979,981 | 4/1961 | Ludwig | 84—44 |
| 3,039,235 | 6/1962 | Heinrich | 51—73 |
| 3,175,548 | 3/1965 | Weiss | 125—15 |
| 3,254,641 | 6/1966 | Blaine | 125—15 |

HAROLD D. WHITEHEAD, *Primary Examiner.*